United States Patent Office 3,798,193
Patented Mar. 19, 1974

3,798,193
PROCESS FOR PREPARING AN ELECTRO-
COATING COMPOSITION
Girish Girdhar Parekh, Stamford, and Werner Josef
Blank, Wilton, Conn., assignors to American Cyanamid
Company, Stamford, Conn.
No Drawing. Continuation-in-part of abandoned application Ser. No. 139,912, May 3, 1971. This application Sept. 28, 1972, Ser. No. 293,235
Int. Cl. C08g 51/24
U.S. Cl. 260—29.4 UA      10 Claims

ABSTRACT OF THE DISCLOSURE

A process for preparing an electrocoating composition comprising mixing (1) from about 40% to about 95%, by weight, of a uniquely prepared anionic acrylic polymer containing at least carboxyl and alcoholic hydroxyl functions, (2) from about 4% to about 50%, by weight, of an amine-aldehyde cross-linking agent, (3) from about 1.0% to about 20%, by weight, of a neutralizing agent, such as an alkali hydroxide or an amine, (4) from about 0% to about 70% of pigment, and (5) from 20% to 95% water. The acrylic polymer is prepared by the copolymerization of a styrene, an alkyl acrylate, such as butyl acrylate, and maleic anhydride which is followed by reaction with an appropriate aliphatic diol containing of from 3 to 8 carbon atoms and possessing primary and secondary hydroxyl groups, such as 1,2-propylene glycol and 2,2-dimethyl-1,3-butanediol. The composition finds utility in coating applications, wherein the bath stability containing said resinous coating composition and high pigment levels in said composition are assured.

This application is a continuation-in-part of our copending application, Ser. No. 139,912, filed on May 3, 1971, now abandoned.

BACKGROUND AND DESCRIPTION OF PRIOR ART

Water-dispersed polymeric coating compositions have been employed to coat metallic surface as by hand or automatic spray painting, electrostatic painting, brushing, dipping, and more recently, by electrodeposition. These methods have been gaining good acceptance in the coating field, particularly when employing electrodeposition or aqueous spray coating as techniques. Although acceptable uniformity, film strength, hardness, and adhesion are noted in both United States Letters Patent No. 3,403,088 to Donald P. Hart, issued on Sept. 24, 1968 and United States Letters Patent No. 3,471,388, issued on Oct. 7, 1969 to J. N. Koral, a difficult problem is presented where enhanced bath stability, high pigment concentrations, short baking cycles, and low cure temperatures are required.

As is known, it is difficult in small or large scale operations to attain acceptable stability of a coating bath as evidenced by the poor physical properties of the coated articles resulting after short use of known baths. Occassionally, the solids therein precipitate or otherwise coagulate. Such instability requires replenishing or replacing the baths at frequent intervals, which is both time and treasury consuming. Further, short baking cycles as well as low temperature cures of coated substrates are difficult to attain. If a coating composition could be provided to avoid these noted difficulties, such would meet a long-felt need in the art.

SUMMARY

In a five-component coating composition which can be used effectively, particularly to enhance bath stability by electrophoretic techniques, a novel method for preparing one of the components, namely, the anionic acrylic resin component free from detectible monomer, has been discovered. The latter is prepared by copolymerizing a styrene with maleic anhydride and an alkyl acrylate, followed by reaction with an appropriate diol containing primary and secondary hydroxyl groups and from 3 to 8 carbon atoms hereinbelow more fully defined. In the prior practice where alkyl acrylate, hydroxyalkylmaleate and styrene are copolymerized under similar reaction conditions, detectible unreacted monomer, usually in the range of 0.3% to 3%, is found in the polymer.

DESCRIPTION OF THE INVENTION INCLUDING PREFERRED EMBODIMENTS

As one component of a five-component system, there is provided a novel process for preparing an acrylic, anionic water-dispersible, non-gelled polymer containing at least carboxyl and alcoholic hydroxyl functions. The polymer, free from unreacted monomer, is prepared by initially polymerizing in the presence of a free radical initiator a blend of (A) an alkyl acrylate, (B) maleic anhydride, and (C) a polymerizable styrene, and thereafter, reacting the resultant polymer with an appropriate diol.

The overall reactions may be illustratively written as follows:

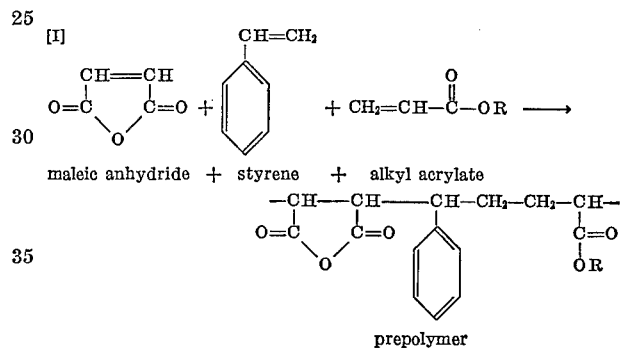

where R is an alkyl group of from 1 to 6 carbon atoms, and

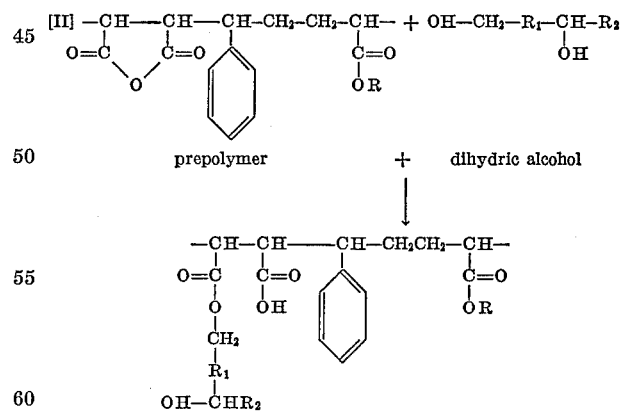

where R is as defined above, $R_1$ is an alkyl radical containing from 0 to 5 carbon atoms, $R_2$ is alkyl of from 1 to 6 carbon atoms and $R_1$ and $R_2$ equals 1 to 6 carbon atoms.

It is a good practice in Step [I] to utilize a mole ratio of maleic anhydride to styrene ranging from 0.1–1 to 1, respectively. For best operation, the mole ratio of maleic anhydride to styrene ranges from 0.4–0.6 mole to 1 mole, respectively.

Illustrative acrylates are: methyl acrylate, ethyl acrylate, propyl acrylate, butyl acrylate, octyl acrylate, decyl acrylate, lauryl, acrylate, methyl methacrylate, ethyl methacrylate, butyl methacrylate, heptyl methacrylate, decyl methacrylate, and the like.

Exemplary of the polymerizable styrenes in Step [I] are: styrene, ortho-, meta-, or para-alkyl styrenes such as the o-, m-, or p-methyl, ethyl, propyl, and butyl styrenes, 2,4-dimethyl styrene, 2,3-dimethyl styrene, 2,5-dimethyl styrene, halo-ring or side-chain styrenes, such as α-chloro styrene, ortho-, meta-, or para-chlorostyrene, 2,4-dichlorostyrene, 2,3-dichlorostyrene, 2,5-dichlorostyrene or the alkyl side-chain styrenes, such as α-methyl styrene, α-ethyl styrene, and the like.

It will be noted that in Step [I] above, a prepolymer or copolymer is produced which contains an hetero-O-moiety. In Step [II], the latter moiety is affected by opening the hetero-O-ring by means of an appropriate diol to provide both carboxyl and hydroxyl functions.

In general, at least equimolar amounts of diol and anhydride group in the prepolymer are reacted. However, up to about a 25% molar excess of the diol may be employed.

In step [II], the diol is exemplified by an appropriate lower aliphatic glycol having both primary and secondary hydroxyl groups containing from 3 to 8 carbon atoms. Exemplary of the diols are: 1,2-propylene glycol, 1,2-butanediol, 1,3-butanediol, 2,2-dimethyl-1,3-butanediol, and 2,2,4-trimethyl-1,3-pentanediol.

Free radical initiators required for the polymerization reaction are commercially available. Any may be used in the process of the present invention. Illustrative of such initiators are di-t-butyl peroxide, benzoyl peroxide, and azobisisobutyronitrile. Other conditions of reactions, such as temperatures of reactions, are known. For instance, polymerization occurs at temperatures ranging from about 125° C. and 200° C. Resultant anionic polymeric material is found to be free from unreacted monomer as determined by vapor phase chromatographic tests.

For good bath stability of electrocoating paint and good storage stability of water-dispersed sprayable paint as well as for good corrosion and humidity resistance, high concentrations of pigments, as well as smoothness and blister-free appearance, it is advantageous to utilize anionic polymers containing from about 1.0% to about 25%, and preferably from 4% to 15% of the carboxyl function, and from 0.5% to 10%, and preferably from 1.5% to 4% of the hydroxyl funciton, all percentages based on the weight of the overall finished polymer.

In general, the finished polymer free from detectable monomer exhibits the following properties: Acid number ranging from 55 to 95; Hydroxyl number ranging from 44 to 95; Viscosity: $Z_2$ to $Z_6$ (when solids equal 50% to 80%); Gardner color from 1 to 4.

It may be desirable to use appropriate surfactants to disperse the aforementioned polymeric materials. The term "water-dispersible," therefore, is intended to encompass both aqueous solutions as well as dispersions in which the polymeric material is suspended in the aqueous medium.

All of the anionic water-dispersible, non-gelled polymeric materials having carboxyl groups and alcoholic hydroxyl groups have water-sensitive sites obviously, by virtue of the presence of these groups, and these water-sensitive sites should be tied up by interreaction with the second component of the system, namely, an amino aldehyde compound in a cross-linking mechanism. Before the cross-linking takes place, the aminoaldehyde compounds also function as plasticizers for the total composition.

The second component of the coating mixture containing the hereinabove defined polymer is a partially or fully etherified amino-aldehyde cross-linking agent. Usually, the latter aminoaldehyde cross-linking agent is present in amounts ranging from about 4.0% to about 50%, and the balance being pricinpally the polymer containing at least carboxyl and hydroxyl functions. Advantageously, any fully etherified amino cross-linking agent can be incorporated herein, as for instance, hexakismethoxymethtylmelamine which is prepared according to the process shown in United States Letters Patent No. 2,998,411, which patent is incorporated herein by reference. Modification of the hexakismethoxymethylmelamine is shown in United States Letters Patent No. 3,471,388, wherein a mixture of substantially water-insoluble, substantially fully etherified hexamethylolmelamines which have no more than four methoxy methyl groups on the average and at least two alkoxy methyl groups selected from the group consisting of ethoxy methyl, propoxy methyl, and butoxy methyl. These mixed fully etherified hexamethylolmelamine compounds are disclosed in said patent and incorporated herein by reference. Additionally, the fully etherified tetramethylolbenzoguanamine compounds may also be used, such as those disclosed in United States Letters Patent No. 3,091,612 and in earlier United States Letters Patent Nos. 2,197,357 and 2,454,495, all of which are incorporated herein by reference.

The anionic polymer and the fully etherified aminealdehyde cross-linking agent are admixed with agitation. Usually, a neutralizing agent such as either an inorganic base, such as sodium hydroxide or an organic amine, such as a lower alkylamine, or a lower alkanolamine as for instance, diethylamine, triethylamine, or diisopropanolamine is added to effect solubilization of the polymer, in amounts ranging from 1% to 10%, by weight, of the polymer.

It has bene found that for a satisfactory electrocoating bath, such can be prepared from the aforementioned mixture by blending the same with deionized water to effect its emulsification. It is good practice to next age the emulsified blend for a period of 24 hours. The solids content of the bath is maintained at from 1% to 20%, and preferably from 5% to 15%, based on the overall weight of the emulsion.

Although formulations of the above components find utility in the areas of conventional organic aqueous spray coating, adhesives and thermoset resins, it finds particular utility in electrodeposition techniques, since the properties of electrocoated surfaces are markedly enhanced, as for instance, resistance to corrosion and solvent exposure.

Electrodeposition is effected at room temperature in the conventional manner by utilizing a metallic substrate as an anode and any metallic surface as the cathode by applying a potential of from 25 volts to 500 volts, and preferably from 50 volts to 250 volts, across the electrodes. Generally, one to two minutes are sufficient to accomplish the electrocoating process.

The coated substrate is next water-washed, usually with deionized water, and heat-cured to effect cross-linking of the polymer of the present invention. This can be accomplished at temperatures ranging from about 110° C. to 175° C., or even higher. Further, the coated cured surface is impervious to organic solvents.

It is also within the purview of the present invention to incorporate various dyes and pigment additives to impart color to the polymeric compositions prepared by the process disclosed. For instance, compatible dyes or pigments, such as $TiO_2$, $Fe_2O_3$, metal chromates, such as lead chromate or strontium chromate, or carbon black can be used, such that the resultant coated metal substrate is white, red, yellow, black, or any desired color. Usually, the amounts of pigment incorporated therein range from about 0.1% to about 6% of the overall bath when employing electrocoating techniques and amounts ranging from about 25% to about 70%, or higher, when using spray coating or dip coating techniques without disturbing bath stability.

The following examples are set forth primarily for purposes of illustration and any specific enumeration of detail contained therein should not be interpreted as a limitation except as indicated in the appended claims. All parts and percentages are by weight unless otherwise indicated.

EXAMPLE 1

To a suitable reaction vessel was added a monomer blend of 38.5 parts of butyl acrylate, 19.3 parts of styrene, 8.3 parts of maleic anhydride, and 0.3 part of 2-sulfoethyl methacrylate and copolymerized at 140° C. to 145° C. in the blend of 6.4 parts of cumene and 2 parts of mesityl oxide employing 2 parts of ditertiary butyl peroxide as the free radical initiator. The total monomer feed was slowly added over a period of two and one-half hours. After holding the reaction temperature at 140° C. to 145° C. for two more hours, 7 parts of 1,2-propylene glycol and 0.4 part of triethylamine were added. The temperature was held at 135° C. for two hours. Subsequently, the polymer was diluted with n-butanol (16.4 parts). Resultant polymer analyzes as having an acid number of 74, an hydroxyl number of 65, and a viscosity of 200 poises at 25° C. Vapor phase chromatography indicates the absence of any unreacted monomer.

Similar polymers are obtained when substituting 2,2-dimethyl-1,3-butanediol, in lieu of the 1,2-propylene glycol above.

EXAMPLE 2

Repeating the procedure of Example 1 in every respect except that 2-sulfoethyl methacrylate was omitted, the resultant polymer analyzes as having an acid number of 72, an hydroxyl number of 65, and a viscosity of 210 poises at 25° C. Vapor phase chromatography indicates the absence of any unreacted monomer.

Similar polymers are obtained when utilizing 1,3-butanediol in place of 1,2-propylene glycol above.

COMPARATIVE EXAMPLE 3

This example illustrates a prior art procedure employing a mixture of half esters of maleic acid and 1,2-propylene glycol.

As in Example 1 above, a monomer blend of 38.5 parts of butyl acrylate, 19.3 parts of styrene, and 15.4 parts of a mixture of half esters of 1,2-propylene glycol and maleic acid was copolymerized in the blend of 10 parts of 2-ethoxyethanol, 6.4 parts of cumene, and 2 parts of mesityl oxide under the same reaction conditions (i.e., time, temperature, and catalyst) as used in Example 1. Finally, the polymer was diluted with additional 2-ethoxyethanol (6.4 parts) and analyzed as having an acid number of 75, an hydroxy number of 65, and a viscosity of 150 poises at 25° C. Vapor phase chromatography indicated the presence of 1% unreacted maleate monomer.

EXAMPLE 4

As in Example 3 above, a monomer blend of 38.5 parts of butyl acrylate, 19.3 parts of styrene, and 15.4 parts of a mixture of a half ester of 1,2 propylene glycol and maleic acid was copolymerized in a blend of 6.4 parts of cumene and 2 parts of mesityl oxide under the identical reaction conditions of time, temperature, and catalyst employed therein. Prior to complete reaction, the reaction mixture gelled and could not be further processed.

EXAMPLE 5

As in Example 2 above, a monomer blend of 38.5 parts of butyl acrylate, 19.3 parts of styrene, and 8.3 parts of maleic anhydride was copolymerized at 165° C. in 6.4 parts of p-cumene employing ditertiary butyl peroxide (2 parts) as the radical initiator. The feed time of the monomer blend was three and one-half hours. The reaction was held at 165° C. for one hour after complete addition of the monomer blend. Subsequently, the reaction temperature was lowered to 135° C., and 7.5 parts of 1,2-propylene glycol and 0.4 part of triethylamine were added. The reaction temperature was held at 135° C. for two hours. Resultant polymer was diluted with n-butanol (16.4 parts). On analysis, it was found to be free of monomer and had an acid number of 71 and an hydroxyl number of 67.

EXAMPLE 6

The procedure of Example 5 is repeated except that 0.3 part of 2-sulfoethyl methacrylate is added to form the finished anionic resin containing hydroxyl, carboxyl, and sulfonic acid functions, free of monomer.

EXAMPLE 7

To a paste consisting of 221.1 parts of the polymer of Example 1, 4 parts of dimethylethanolamine and 226.4 parts of titanium dioxide prepared on a three roll mill was added a blend of 117.6 parts of the polymer of Example 1 and 41.8 parts of tetraethoxymethyl dimethoxymethyl melamine. To this total paste, a blend of 0.8 part of p-toluene sulfonic acid, 15.4 parts of Cellosolve, 7.1 parts of dimethylethanolamine, and 34 parts of deionized water was added in a cowel mixer. Finally, the latter was diluted with 305.7 parts of deionized water.

Aluminum panels were spray-coated with the emulsion paint obtained above and baked at 165° C. for 20 minutes. The film thickness was approximately 1 mil and gloss 90% (60°) and 85% (20°). The film appearance was good

COMPARATIVE EXAMPLE 8

A similar coating composition was prepared with the polymer prepared in Example 3 above following the procedure of Example 7. However, to obtain a paint emulsion on the addition of deionized water, there resulted a coagulated composition. This composition could not be spray coated on aluminum or any other metal substrate.

EXAMPLE 9

To the mixture of 77 parts of polymer prepared in Example 1 above, 18 parts of tetra (ethoxymethyl) di (methoxymethyl) melamine, 4 parts of diisopropanolamine, and 28 parts of titanium dioxide (rutile type) were added with agitation. To this paste was added deionized water (860 parts) stepwise under vigorous agitation.

Resultant aqueous paint, after aging as a bath for 24 hours, was employed to electrocoat zinc phosphated steel and aluminum substrates. After rinsing with deionized water, the coated panels were baked at 125° C. for 30 minutes.

Film properties obtained are summarized in Table I below.

TABLE I

| | Thickness (mil) | Knoop Hardness | Impact (reverse) in. lb. | Gloss (in percent) at— | |
|---|---|---|---|---|---|
| | | | | 60° | 20° |
| Steel substrate: | | | | | |
| 200 v. | 0.6 | 8.4 | 60 | 77 | 45 |
| 250 v. | 0.9 | 4.8 | 40-50 | 79 | 53 |
| Aluminum: 200 v. | 0.9 | 4.8 | 20 | 81 | 64 |

Similar results are obtained with compositions prepared from the polymer prepared in Example 5 above.

EXAMPLE 10

To the mixture of 77 parts of the polymer as prepared in Example 2, 18 parts of tetra (ethoxymethyl) di (methoxymethyl) melamine, 4 parts of diisopropanol amine, and 28 parts of titanium dioxide (rutile type) were added with agitation. To this paste was added deionized water (860 parts) in portions under vigorous agitation.

Resultant aqueous paint, after aging for 24 hours, was employed to electrocoat zinc phosphated steel and aluminum substrates. The coated panels were baked at 175° C. for 20 minutes. The film properties obtained were similar to those obtained in Example 9 above.

COMPARATIVE EXAMPLE 11

To the mixture of 77 parts of the polymer prepared in Example 3 above, 18 parts of tetra (ethoxymethyl) di (methoxymethyl) melamine, 5 parts of diisopropanolamine, and 28 parts of titanium dioxide (rutile type) were added 860 parts of deionized water in several portions under vigorous agitation. The resulting aqueous paint, after aging for 24 hours, was employed to electrocoat zinc phosphated steel and aluminum substrates at from 200 to 250 volts. The coated panels were then washed with deionized water and baked at 175° C. for 20 minutes. Initial film properties, such as gloss, thickness, hardness, and flexibility, were comparable to those obtained in Examples 9 and 10 above. However, coagulation of solids in the bath appeared within three days. Further, the gloss and film thickness were reduced considerably in four to seven days. The bath had to be replaced within 48 hours to maintain uniformity of physical properties of the substrates being coated.

EXAMPLE 12

To the mixture of 72 parts of polymer prepared in Example 5 above, 18 parts of tetra (ethoxymethyl) di (methoxymethyl) melamine, 5 parts of diisopropanol amine, and 28 parts of titanium dioxide (rutile type) were added with agitation. To this paste was added deionized water (860 parts) in portions under vigorous agitation.

Resultant aqueous paint, after aging as a bath for 24 hours, was employed to electrocoat zinc phosphated steel and aluminum substrates. The coated panels, after rinsing with deionized water, were baked at 175° C. for 20 minutes. Film properties obtained are summarized in Table II.

TABLE II

| | Thickness (mil) | Knoop Hardness | Impact (reverse) in. lb. | Gloss (in percent) at— | |
|---|---|---|---|---|---|
| | | | | 60° | 20° |
| Steel substrate: | | | | | |
| 150 v | 0.9 | 9.2 | 5-10 | 82 | 57 |
| 200 v | 1.0 | 8.0 | 5-10 | 84 | 64 |
| Aluminum: 100 v | 0.9 | 7.0 | 5-10 | 87 | 70 |

EXAMPLE 13

A aqueous paint was prepared as in Example 12 using resin prepared in Example 6. The resultant paint was aged for 24 hours. Panels of zinc phosphated steel and aluminum substrate were electrocoated for a period of one minute. The coated panels, after rinsing with deionized water, were baked at 125° C. for 30 minutes. The film properties are noted below in Table III.

TABLE III

| | Thickness (mil) | Knoop Hardness | Impact (reverse) in. lb. | Gloss (in percent) at— | |
|---|---|---|---|---|---|
| | | | | 60° | 20° |
| Steel substrate: | | | | | |
| 150 v | 0.8 | 6.0 | 15 | 82 | 64 |
| 200 v | 1.0 | 4.1 | 15 | 84 | 68 |
| Aluminum: 100 v | 1.0 | 4.7 | 15 | 88 | 76 |

The bath stabilities of electrocoating baths prepared in Examples 9, 10, 12, and 13 from resins in Examples 1, 2, 5, and 6, respectively, is unchanged in terms of film properties and conductivity of the bath over a period of two months.

What is claimed is:

1. A process for preparing an electrocoating composition which comprises admixing, in aqueous medium,
   (1) from about 40% to about 95%, by weight, of an anionic acrylic polymer containing at least carboxyl and alcoholic hydroxyl functions, (2) from about 4.0% to about 50%, by weight, of a fully etherified aminotriazine-formaldehyde cross-linking agent, (3) from 1% to about 20%, by weight, of a neutralizing agent, and (4) form about 0% to about 70% of a pigment; the improvement comprising preparing said polymer by initially copolymerizing by heating at a temperature between about 125° C. and 200° C. a blend of monomers comprising maleic anhydride, a styrene, and an alkyl acrylate in the presence of a free radical initiator and, thereafter, reacting resultant polymer with an aliphatic diol containing from about 3 to 8 carbon atoms and possessing primary and secondary hydroxyl groups, said monomers and diol being present in amounts sufficient to supply to the resultant overall polymer from about 1% to about 25% of the carboxyl function and from about 0.5% to about 10% of the hydroxyl function, based on the said polymer, wherein so-formed polymer is free from unreacted monomer.
2. The process of claim 1 wherein the styrene reactant is styrene.
3. The process of claim 1 wherein the alkyl acrylate is n-butyl acrylate.
4. The process of claim 1 wherein the diol is 1,2-propylene glycol.
5. The process of claim 1 wherein the diol is 1,3-butanediol.
6. The process of claim 1 wherein the diol is 2,2-dimethyl-1,3-butanediol.
7. A product prepared by the process of claim 1.
8. The product prepared by the process of claim 2.
9. The product prepared by the process of claim 3.
10. The product prepared by the process of claim 4.

References Cited
UNITED STATES PATENTS

| 3,245,933 | 4/1966 | Muskat | 260—29.4 UA |
|---|---|---|---|
| 3,352,806 | 11/1967 | Hicks | 260—29.4 UA |
| 3,474,076 | 10/1969 | Dalibor et al. | 260—856 |
| 3,661,819 | 5/1972 | Koral et al. | 204—181 |
| 3,707,584 | 12/1972 | Tulacs | 260—851 |

LORENZO B. HAYES, Primary Examiner

U.S. Cl. X.R.

204—181; 260—851, 856